Sept. 15, 1931.   J. H. JOHNSON   1,823,401
COMBINATION PNEUMATIC AND SPRING SUPPORT FOR VEHICLES
Filed March 5, 1929   2 Sheets-Sheet 1
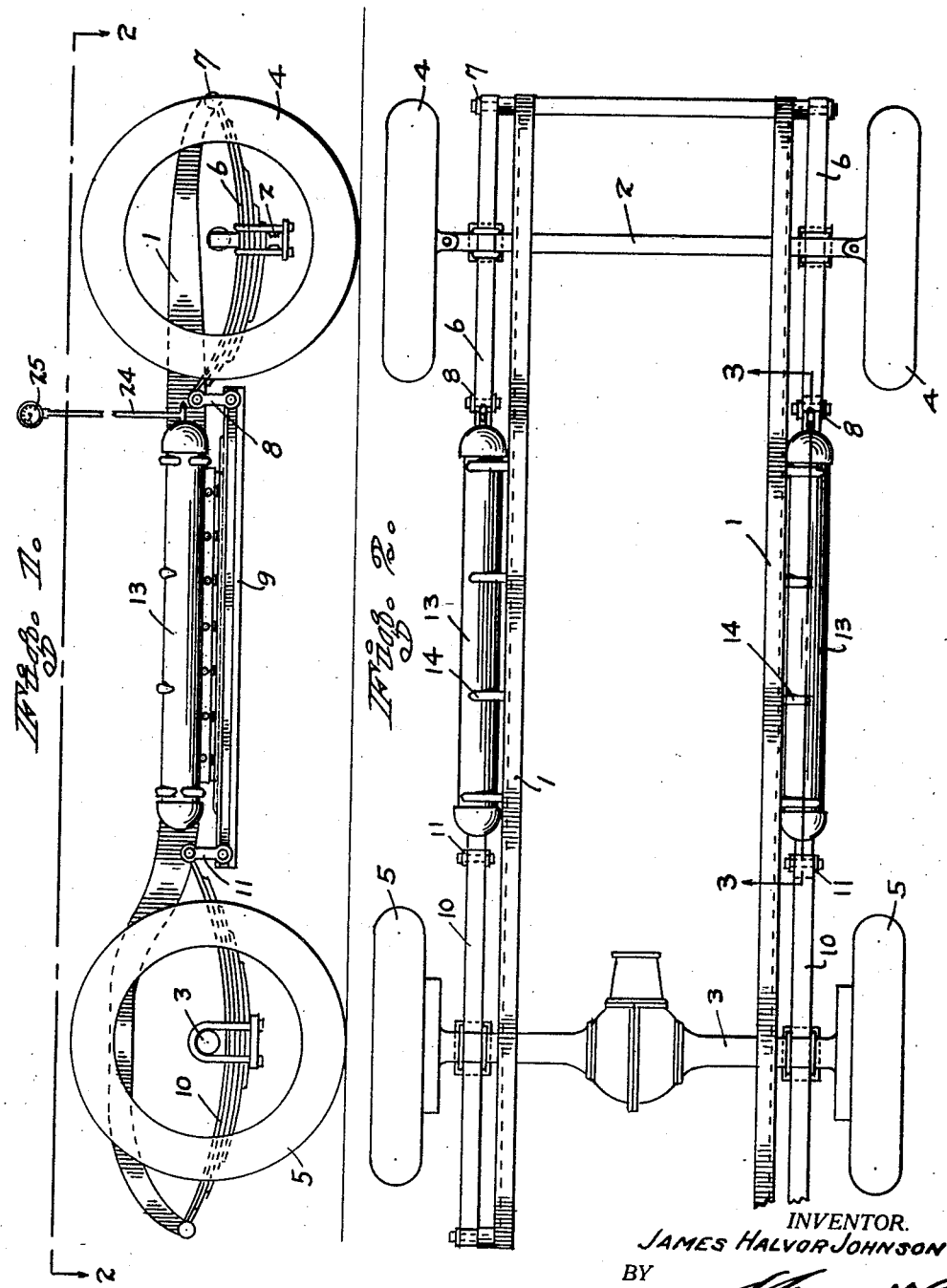
INVENTOR.
JAMES HALVOR JOHNSON
BY
ATTORNEYS.

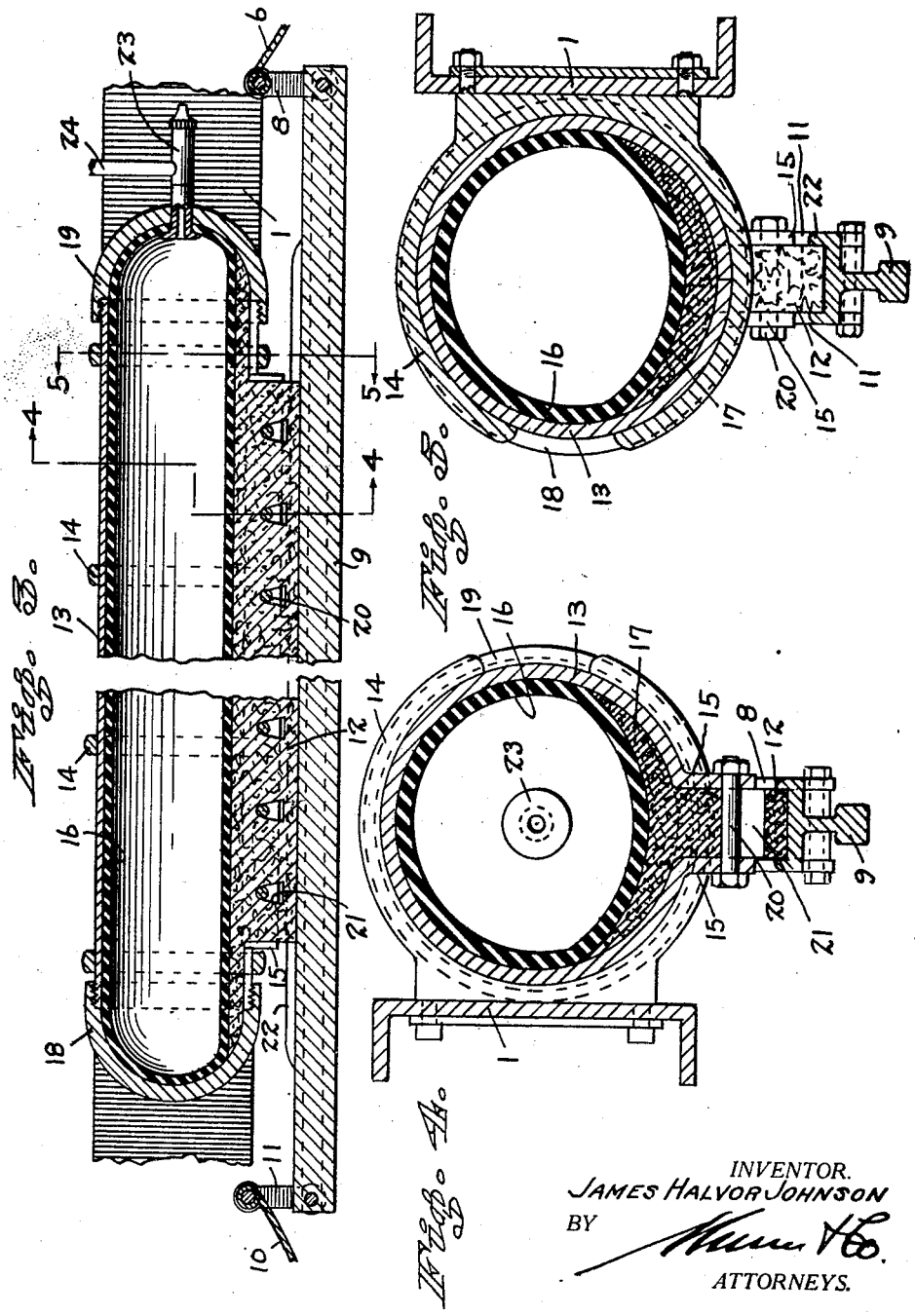

Patented Sept. 15, 1931

1,823,401

UNITED STATES PATENT OFFICE

JAMES HALVOR JOHNSON, OF SAN MATEO, CALIFORNIA

COMBINATION PNEUMATIC AND SPRING SUPPORT FOR VEHICLES

Application filed March 5, 1929. Serial No. 344,444.

My invention relates to improvements in combination pneumatic and spring supports for vehicles, and it consists in the combinations, constructions and arrangements hereinafter described and claimed.

An object of my invention is to provide a more buoyant support for vehicle bodies than that afforded by the standard springs. To accomplish this, I connect the inner ends of the springs to an air-inflated member. This member is preferably elongated, and the inner ends of the springs are connected to an elongated rigid member, the latter bearing against the air-inflated member, whereby the shocks transmitted to either the front or back wheel by bumps in the road surface will be transmitted to the pneumatic member and to the spring of the associate wheel.

The device is simple in construction, and the air pressure may be varied for accommodating loads of different weights.

Other objects and advantages will appear as the specification proceeds, and the novel features will be particularly pointed out in the appended claims.

My invention is illustrated in the accompanying drawings, in which

Figure 1 is a side elevation of the device;

Figure 2 is a section along line 2—2 of Figure 1;

Figure 3 is a section along line 3—3 of Figure 2; and

Figures 4 and 5 are sections along the lines 4—4 and 5—5 of Figure 3.

In carrying out my invention I make use of a chassis 1 which has a front axle 2, a rear axle 3, front wheels 4, and rear wheels 5. The front and back wheels on each side of the vehicle are connected to each other in exactly the same way, and therefore a description of the wheels on one side will suffice. Like reference numerals will be applied to similar parts.

The front wheel 4 is mounted upon the front axle 2, and the latter is carrier by a leaf spring 6. The front end of the spring is connected to the front of the chassis at 7, and the rear end is connected to a shackle 8 which in turn is secured to a girder 9.

In like manner the rear wheel 5 is supported by a leaf spring 10, and the latter has its forward end connected by a shackle 11 to the girder 9. The girder 9 is relatively long and bears against the underside of a rubber member 12. The member 12 extends through a considerable length of the car for a purpose hereinafter described.

It is best now to set forth the exact construction of the pneumatic support. A metal cylinder 13 is secured to the side of the chassis 1 by clips 14, the latter being carried by the chassis. Figure 4 shows the cylinder as being open along its bottom and being provided with flanges 15 that extend downwardly. The rubber member 12 is placed within the split cylinder 13 so that its depending portion lies between the flanges 15 and extends below the flanges, and then an inner tube 16 is placed within the cylinder 13 above the rubber member 12 for air inflation. The upper portion 17 is enlarged and curved conformably to the shape of the cylinder for providing a seat for the inner tube 16.

After the parts have been assembled, caps 18 and 19 are screwed upon the threaded ends of the split cylinder 13. The flanges 15 are secured together by bolts 20, and these bolts are passed through triangularly-shaped openings 21 (see Figure 3) in the member 12. The top of the girder 9 may be provided with side flanges 22 (see Figures 3 and 5) for preventing lateral movement between the girder and the member 12. The weight of the car holds the member 12 down upon the girder at all times.

A valve 23 (see Figure 3) communicates with the interior of the inner tube 16. A pipe 24 leads from the valve casing at a point in front of the valve so as to be in direct communication with the air pressure within the inner tube. This pipe 24 terminates at an air pressure gauge 25 (see Figure 1) which may be placed upon the dashboard of the automobile.

From the foregoing description of the various parts of the device, the operation thereof may be readily understood.

When air is pumped into the inner tube 16, the member 12 backed by air pressure, engages with the girder 9 and has the effect of placing the major weight of the vehicle upon an air cushion that rests upon springs.

It is contemplated that it will be advantageous to construct the springs with a difference in degree of flexibility in the sections forward of the axles and in the sections to the rear of the axles in order that most of the vehicle load will rest upon the pneumatic spring combination. In Figure 1, for example, I show additional leaves being placed on the sides of the springs 6 and 10 that extend between the axles 2 and 3 and the girder 9. This will make these portions of the leaf springs stronger than the remainder of the springs.

The weight of the particular car and its designed capacity are factors to be taken into consideration when figuring the flexibility differentiation. The device will give the ease of riding on air with a supplemental spring action when traveling over uneven portions of the roadbed.

Should the air pressure fall below the required amount to support the weight, the load will cause the bolts 20 to rest upon the bottoms of the slots 21, and there would be a resilient support between the bolts and the girder because the member 12 is made of rubber. The prime purpose of the bolts 20 is to strengthen the air chamber at its opening, permitting a high air pressure with a light chamber wall. It is obvious that the air chamber can be placed in other positions on the chassis without departing from the spirit and scope of the invention.

The weight of the car rests upon the girder 9 and the outer ends of the springs 6 and 10. When, for example, the front wheel 4 is abruptly moved upwardly in striking a bump, the axle 2 will be thrown upwardly and will tend to lengthen the spring 6. The ends of the spring will tend to move the front of the chassis upwardly and the front end of the girder 9 upwardly. The force exerted at these two points will not be as great as that exerted upon the axle, because the spring 6 has a certain amount of resiliency.

Any upward movement of the girder 9, pivoting about the shackle 11, is absorbed by the air in the inner tube 16, with the result that any upwardly moving force exerted by the rear of the spring 6 will be progressively transmitted throughout the entire length of the inner tube, and in this way be transmitted through a large portion of the body of the chassis rather than upon a fixed point, as would be the case if the shackle 8 were secured to the chassis as is now the standard practice. A distributing of the force throughout a larger area will lessen the strain upon the chassis materially, and protect the machinery against injury. Road shocks would be damped.

It will still further be observed that the girder 9 will tend to have a rocking effect upon the inner tube as the front of the girder is suddenly raised due to the fact that a portion of the air within the tube will rush to the rear end thereof and will tend to move the rear end of the girder 9 downwardly. This will be prevented by the spring 10, and therefore the rear spring will have a tendency to offset the blow caused by the front wheels striking a bump. The result will be a more even and level moving of the chassis over the ground. This construction will also do away with the necessity of providing snubbers, because in the case just illustrated the spring 10 will act as a snubber. In case the rear wheels strike a bump, the reverse operation of that already set forth will follow, and the front spring 6 will act as a snubber.

Further, a general balance and steadiness of the car when in motion will be attained through the described pneumatic-spring combination. There will be less tendency for the car to lurch and sway, and its center of gravity will remain more centered, especially important in covering road turns.

Although I have shown and described one embodiment of my invention, it is to be understood that the same is susceptible of various changes, and I reserve the right to employ such changes as may come within the scope of the invention as claimed.

I claim:

1. A resilient support for a vehicle body comprising a leaf spring for each front wheel, the front of each spring being connected to the vehicle, a leaf spring for each rear wheel having their rear ends connected to the vehicle, an elongated flexible air tube disposed on each side of the vehicle body and a girder for each tube, each girder bearing against its respective tube and having its ends connected to the inner ends of said springs whereby movements of the springs will cause the girders to compress their respective tubes.

2. A resilient support for a vehicle body comprising a leaf spring for each front wheel having their front ends connected to the vehicle, a leaf spring for each rear wheel having their rear ends connected to the rear of the vehicle, an elongated partially split and flanged container disposed on each side of the body, an elongated resilient member slidably mounted between said flanges and having slots, bolts carried by said flanges and extending through said slots and having play therein, an inner tube disposed in said container and above said resilient member, and a girder for each container and bearing against said resilient member, said girders having their ends connected to said springs.

3. A resilient support for a vehicle body comprising elongated members, each being connected to the front and back wheels of the vehicle, and elongated flexible air cushions connecting the members with the vehicle body, said members contacting with said cushions substantially throughout the lengths of the latter.

4. A resilient support for a vehicle body comprising elongated members, each being connected to the front and back wheels of the vehicle, elongated air inflated tubes connected to the vehicle body throughout their lengths, said members bearing against said tubes substantially throughout the entire lengths of the latter.

5. A resilient support for a vehicle body comprising elongated members, each being connected to the front and back wheels of the vehicle, elongated air inflated tubes connected to the vehicle body throughout their lengths, said members bearing against said tubes substantially throughout the entire lengths of the latter, and springs disposed between the members and the wheels.

6. A resilient support for a vehicle body comprising a tubular casing secured to the body, an air inflated flexible inner tube disposed within the casing, a resilient member bearing against the entire length of the inner tube, a bar bearing against the entire length of the resilient member, and springs connecting the bar with the front and back wheels of the vehicle.

7. A resilient support for a vehicle body comprising a tubular casing secured to the body, an air inflated flexible inner tube disposed within the casing, a resilient member bearing against the entire length of the inner tube, a bar bearing against the entire length of the resilient member, springs connecting the bar with the front and back wheels of the vehicle, said resilient member having slots therein, and transversely extending members slidable in said slots and being carried by the casing.

Signed at Los Angeles, in the county of Los Angeles and State of California this 25th day of February A. D. 1930.

JAMES HALVOR JOHNSON.